United States Patent [19]
Swanson et al.

[11] Patent Number: 5,854,809
[45] Date of Patent: Dec. 29, 1998

[54] DATA RECOVERY METHOD AND APPARATUS FOR JITTER TOLERANT PEAK DETECTED CHANNELS

[75] Inventors: Robert Earl Swanson, Del Mar; Thomas Daniel Carr, Leucadia, both of Calif.

[73] Assignee: Eastman Kodak Company, Rochester, N.Y.

[21] Appl. No.: 640,985

[22] Filed: Apr. 29, 1996

[51] Int. Cl.⁶ .................................................. H04B 1/66
[52] U.S. Cl. .......................... 375/240; 375/377; 341/59; 358/261.1
[58] Field of Search .................. 375/240, 377, 375/316; 341/59; 358/261.1; 382/245; 704/503; 381/34

[56] References Cited

U.S. PATENT DOCUMENTS

| | | | |
|---|---|---|---|
| 5,138,314 | 8/1992 | Shimpuku | 341/58 |
| 5,341,249 | 8/1994 | Abbott et al. | 360/46 |
| 5,638,065 | 6/1997 | Hassner et al. | 341/59 |

*Primary Examiner*—Chi H. Pham
*Assistant Examiner*—Bryan Webster
*Attorney, Agent, or Firm*—William F. Noval

[57] ABSTRACT

A data recovery technique for jitter tolerant peak detected channels. The number of consecutive zeros between ones are reproduced in a run-length coded, peak detected channel. The interval (time, distance) is measured between peaks of a run-length encoded digital data signal wherein peaks represent ones and absence of peaks represent zeros. A look-up-table is provided having entries for all possible intervals between peaks for the run-length code used and corresponding entries for the number of zeros between ones. The measured interval is applied to the look-up-table to produce a string of zero bits between one bits.

8 Claims, 6 Drawing Sheets

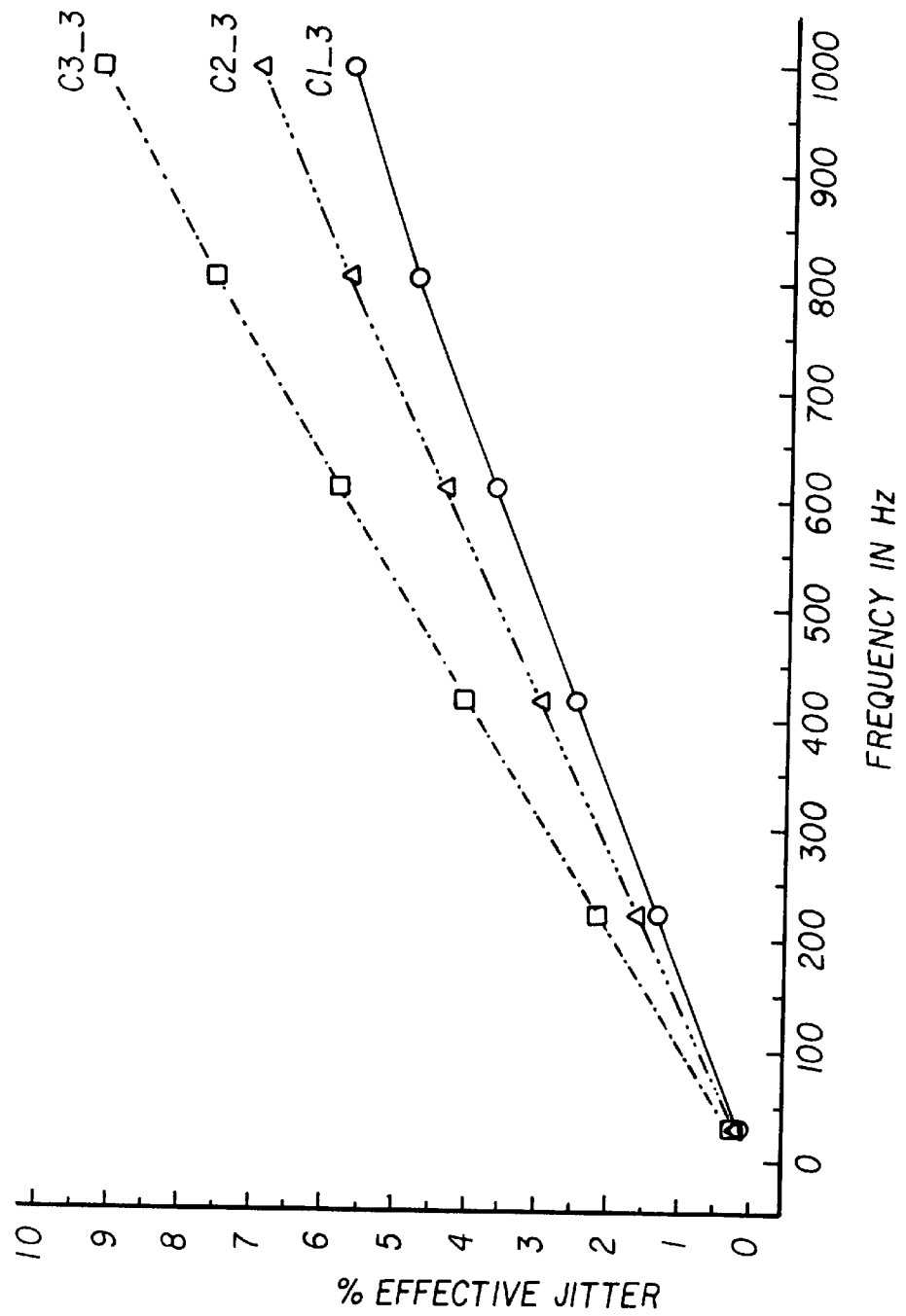

DATA RECOVERY METHOD AND APPARATUS FOR JITTER TOLERANT PEAK DETECTED CHANNELS

FIELD OF INVENTION

This invention relates in general to digital data recording in the area known as the modulation and demodulation of data recorded in peak detected channels. This invention relates more specifically to digital data recording systems that have significant speed uncertainty, i.e. jitter, and especially to that portion of the data recovery process following peak detection, but preceding modulation decoding, i.e., the detection of recorded zeros between recorded ones (peaks).

BACKGROUND OF THE INVENTION

In order to properly record and reproduce data in magnetic storage systems, it is necessary to convert user binary data into channel binary data. This is done according to some constraints of the system so that magnetic transitions written onto the media are spaced effectively so as to balance capacity and the ability to recover the data. This conversion or mapping of user data bits into channel data bits is called modulation and the modulation code is the embodiment of the mapping rules. Most systems use a type of coding called run-length limited, RLL, coding in which magnetic transitions are spaced at intervals that are multiples spaced up to some maximum distance. Shown in FIG. 1, the possible locations after the first one are equally spaced up to same maximum distance. In fact, this uniform spacing is generated by a fixed frequency clock which it is then necessary to reproduce in order to accurately recover the channel data bits. That clock is, generally, recovered using a phase-locked loop. In order to recover the actual channel data which is a series of zero bits followed by a one bit (the magnetic transitions) the clock is first reproduced and then used to delineate channel bit periods that must be either a zero or one. If no transition occurs between clock events the channel data was a zero. If a transition occurs between clock events, the data was a one. After enough zeros and ones are accumulated, a reverse mapping (demodulation) is done. In this process of modulation, sequence detection and demodulation it is essential that the clock be reproduced and reproduced accurately since it denotes channel bit cells which are equivalent to channel data bits. If the clock deviates from the intrinsic frequency too much, the detected channel sequence may have too many or too few zeros in a run-length. This produces false data.

FIG. 2 is the block diagram of a typical magnetic recording/reproduce system 10. User data bits are modulated by modulation circuit 12 into channel data bits whose ones each cause a magnetic transition to be written. The channel bits are amplified by channel amplifier 14 and written on magnetic media 16 by write head 18. Magnetic media 16 moves past heads 18 and 20 in the direction of arrow 17 at a preselected speed. After the magnetic signals are read by read head 20, amplified by read preamp 22, and equalized and peak detected by circuit 24, it is necessary to detect (identify) the run-length sequence. When these sequences are continuously determined by circuit 26, it is possible to demodulate them by circuit 28 into recovered data bits for the user.

Run-length sequence identification for a system that has enough speed stability to reproduce the channel data clock is described below. In systems having too much speed variation during either the write or read operations, it is not possible to accurately reproduce the clock frequency used for writing. To provide for run-length recording in systems having excessive speed jitter (excessive is defined as being unable to reproduce the write clock frequency) codes have been described that have unequal transition spacings. One such code is illustrated in FIG. 3. Three locations are shown having progressively wider spacing as the distance from the last transition increases. Areas of uncertainty are indicated for each location which allow detection over a wider range of spacing to still be interpreted as the nominal location. Notice that each location corresponds to a certain channel bit pattern which is a run of zeros followed by a one. As in the previous example, after enough channel zeros and ones are accumulated, they are demodulated into user data bits. The problem now is to properly identify the transition location and associate it with the correct run of zeros, hence the channel bit pattern in the presence of excess jitter.

In peak detected recording systems, as described above, there is either an explicit or an implied clock in any data bit stream. Knowledge of this clock is essential to the data recovery process. If the system speed is acceptably stable, the clock can be implied in the data stream by writing and reading according to a reference clock in the electronics. Data recovery is accomplished using an inferred timing that is corrected, within limits, by means such as a phase-locked loop. If the system speed is not suitably stable, clock pulses are written along with data pulses to ensure proper timing. In the latter approach, the clock is not inferred but, rather, recovered along with the data. The obvious advantage is increased data density if the clock is inferred rather than written. There is thus a problem in that systems that have significant noise and speed jitter have been poor candidates for recording with implied clocking since clock recovery and, hence, number of bits recorded, is difficult to reconstruct causing loss of information.

SUMMARY OF THE INVENTION

According to the present invention, there is provided a solution to the problems described above. This invention provides for the use of modulation codes having implied clocking for increased density in recording systems that have excessive jitter and, possibly, noise. It is expected, but not required, that modulation codes having a design parameter of jitter tolerance be used. According to one feature of the present invention, there is provided a method of reproducing the number of consecutive zeros in a run-length coded peak detected channel comprising the steps of: measuring the time or distance between transitions, comparing the measured time or distance to expected times for all possible transition spacings for the code used, and determining the appropriate string of zeros corresponding to that time or distance with tolerance allowance for jitter displacement of a transition. The basic embodiment uses a simple measurement and lookup process. An enhanced embodiment uses the current transition spacing measurement to adjust time measurement based on current media speed. In this way, media speed variations are tracked provided those variations occur at rates slower than the recorded and reproduced bit rates.

There are several very clear advantages to the present invention. (1) It allows the use of modulation codes that have implied clocking for higher capacities in systems that have excessive speed jitter. (2) While a clock is not recovered literally by the present invention, implied timing is tracked approximately, i.e., within a close enough estimate, to recover all bits and that timing is tracked over a much wider range than is feasible with phase-locked loops. (3) Further, the present invention provides a digital timing solution that has a simple implementation compared to the usual analog solutions of PLLs. (4) Finally, this method of data recovery integrates readily with the remainder of the data decoding.

BRIEF DESCRIPTION OF THE DRAWINGS

FIG. 6 is a graphical view of the accuracy improvement of another embodiment of the present invention if the previous transition period is used as the speed estimate for the present transition period.

DESCRIPTION OF THE PREFERRED EMBODIMENTS

Figure 4:
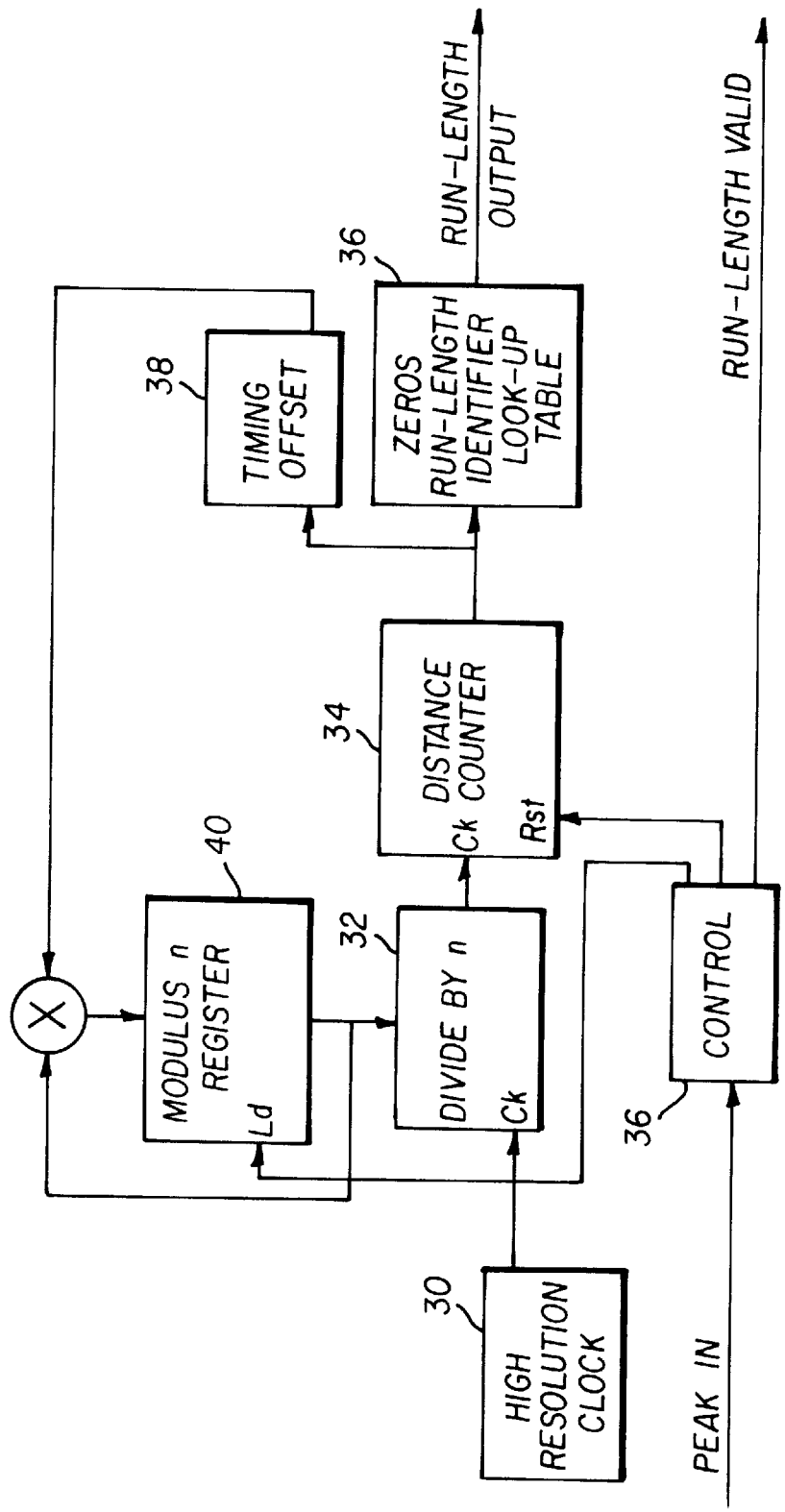
FIG. 4 is a generalized block diagram of the run-length sequence detector of the present invention for systems with large amounts of jitter.

A generalized block diagram of an embodiment of the present invention is shown in FIG. 4 for a sequence identifier 26 that can be used to include speed adjustments from the previous peak spacing. The elements of the circuit are a very high frequency (much higher than the record frequency) (resolution) clock 30 and a counter 32 that divides the high frequency clock signal by some modulus, n. The resulting reduced frequency clock signal is used to increment a counter 34 whose output is related to distance between peaks. Counter 34 is reset by control 36 for each peak occurrence so that its value at the next peak is related to the distance from the resetting peak by the frequency of the clock driving it, i.e., the divided high frequency clock.

Figure 1:
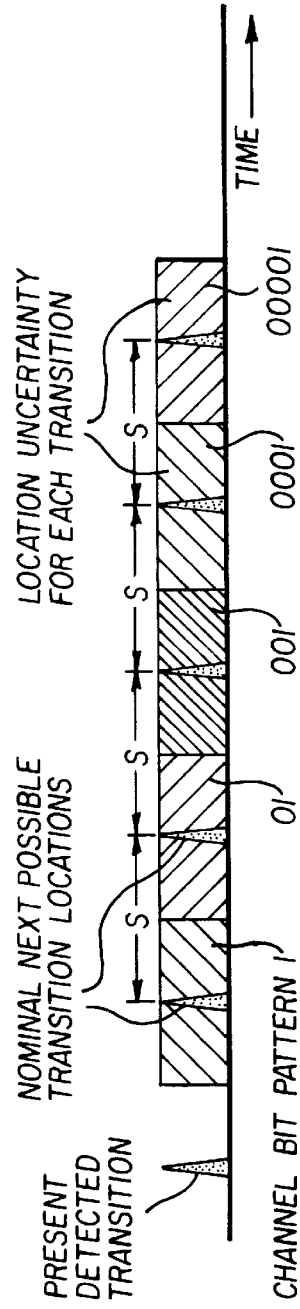
FIG. 1 is a diagrammatic view of a typical run-length recording code with equal transition spacings which expect clock recovery for proper run-length sequence detection.
Figure 2:
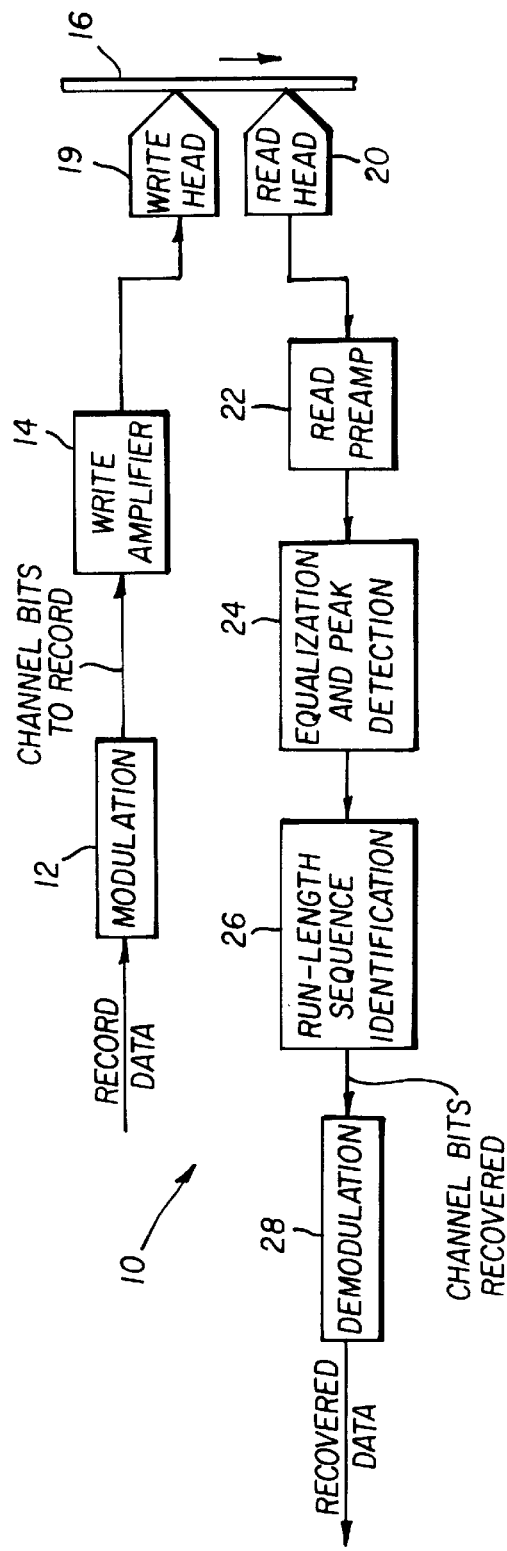
FIG. 2 is a block diagram of a magnetic recording/reproducing system showing the components and location of the run-length sequence detector.
Figure 3:
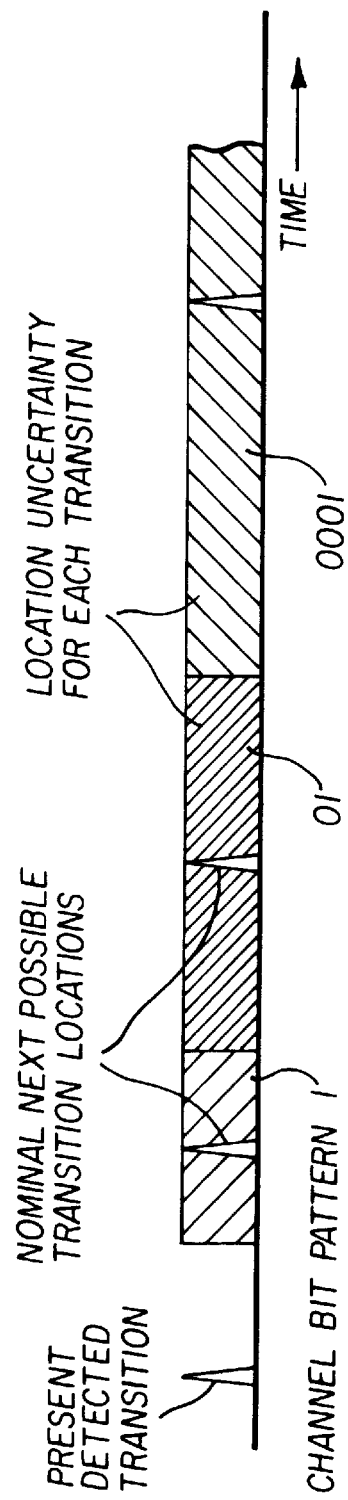
FIG. 3 is a diagrammatic view of a modulation code with unequal transition spacings.

Note that time and distance are related by knowing the speed of the moving media and the clocking frequency: distance=(inches/sec)/(clocks/sec)=inches/clock. The distance counter 34, in essence, finds a spacing between peaks that can be "looked up" in a table 36 (ROM) calculated to find which region of uncertainty (reference FIG. 3) its value lies in. That region is then interpreted as the nominal (center) position and the associated run-length of zeros is assigned.

Since this circuit is used when speed variations are too severe for clock recovery, it may be desirable to use knowledge of the current speed of the moving media to improve the distance estimate for the upcoming peak spacing. More is said on the possible improvements shortly. To accomplish this estimate improvement, the modulus of the frequency division counter 32 may be varied when a peak is detected. To include the result from the previous peak spacing, the distance counter 34 is used to determine a division modulus adjustment by timing offset circuit 38. This adjustment is independent of absolute speed and is used to multiply the current modulus which is stored in a register 40. Finally, a control circuit 36 monitors the output of the peak detector and indicates when to reset the distance counter and load a new time division modulus.

Several embodiments of the invention are presented below. The first, in FIG. 5, ignores the speed information gained over each detected spacing and relies on the region of uncertainty being large enough to accommodate the full range of speed errors. Only the distance counter 34 and a PROM lookup table 36 are needed. With reference to the diagram of FIG. 4, the control is simplified to peak reset only, the feedback path is eliminated, i.e., the modulus is fixed and the divisor is not needed so that the clock is already a fixed frequency. This implementation works well when there is, as mentioned, large regions of uncertainty built into the code itself.

Figure 5:
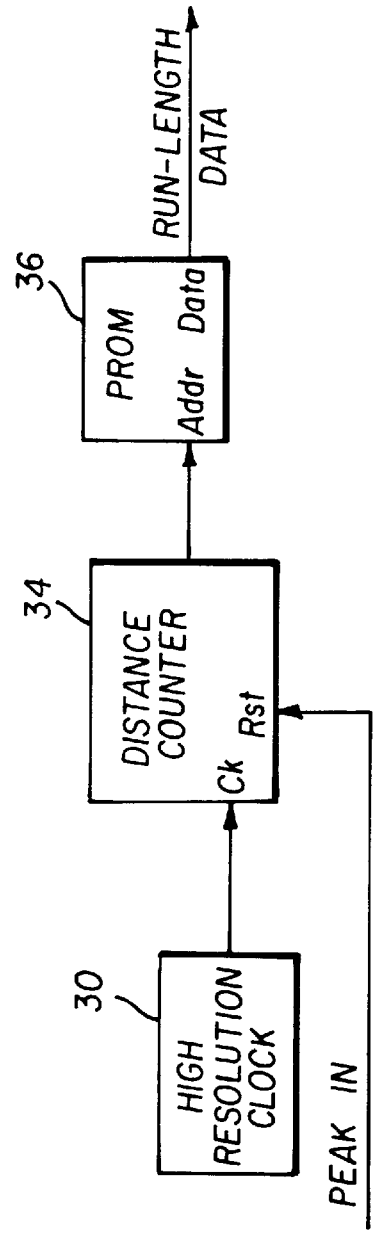
FIG. 5 is a block diagram of an embodiment of the sequence detector of FIG. 4 with no time scaling. Sequence identification is based on present spacing only when using this embodiment.

Performance improvement can be realized over the embodiment of FIG. 5 if information from previous peak-to-peak spacings is used to adjust the nominal values and ranges of uncertainty for the code. This can be done in any of several ways, but the greatest improvement occurs from the information gained in the immediately preceding peak-to-peak space. For example, when a peak occurs, the distance count, in addition to being used for run-length identification, is used to provide an adjustment value for the divisor of the high frequency clock. This may be done, for instance, by considering the value of the distance count to be the new nominal spacing for the uncertainty range that it falls into. The difference between its measured location as given by the counter and the expected nominal location is the amount of adjustment needed. This adjustment takes the form of changing the division counter modulus, either increasing it or decreasing it by multiplication by a factor. This factor may be stored in a look-up table just as the sequence is stored in a table. This technique is speed independent as long as the speed does not change in one peak period beyond the designed range of uncertainty for the code itself.

In order to given an idea of the effectiveness of this technique, refer to FIG. 6, which shows effective jitter as a function of recorded transition frequency when the system is disturbed by a ±10% jitter component. The graphs all relate to the code illustrated in FIG. 3 having the three possible locations shown. Graph C1_3 means the detection of a peak in position 3 following a peak at position 1.

Graphs Cx_3 mean detection of a peak at 3 following a peak at x. In all cases, the effective jitter is less than the actual jitter. While the graphs show results that are not exhaustive, it does indicate that improvement is available and considerable at low frequencies.

Figure 7:
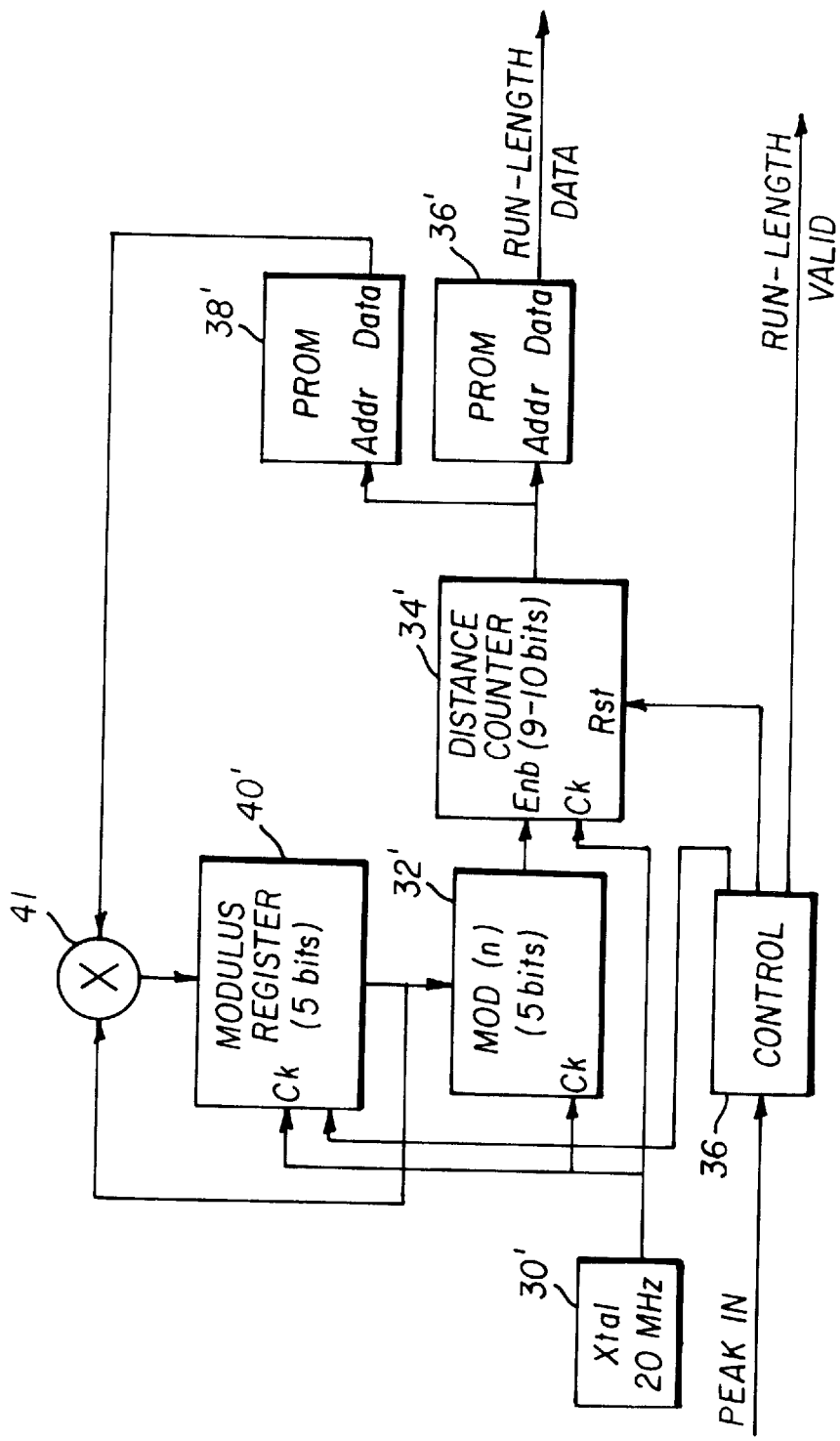
FIG. 7 is a clock diagram of another embodiment of the sequence detector that includes scaling from the previous sequence spacing. Scaling is accomplished using lookup tables and a multiplier for timing adjustment.

FIG. 7 is a diagram of a circuit to implement these ideas for using one previous peak-to-peak period to adjust the clock for the distance counter. Both the run-length sequence data and the adjustment value are stored in PROM type tables 36', 38' for addressing by the value of the distance counter when a peak is detected. That factor is one input to a multiplier 41 whose other multiplicand is the modulus of the division counter 32'. The multiplier 41 may take any of several forms. One form is a shift register if all the adjustment values are binary fractions, i.e., $\frac{1}{2}^n$.

Another form is the sum of shifted values of the modulus when the adjustment value is expressed as a sum of binary fractions, e.g., $\frac{1}{2}^a + \frac{1}{2}^b + \ldots + \frac{1}{2}^z$. These forms are practical and straightforward to implement in digital electronics.

Figure 8:
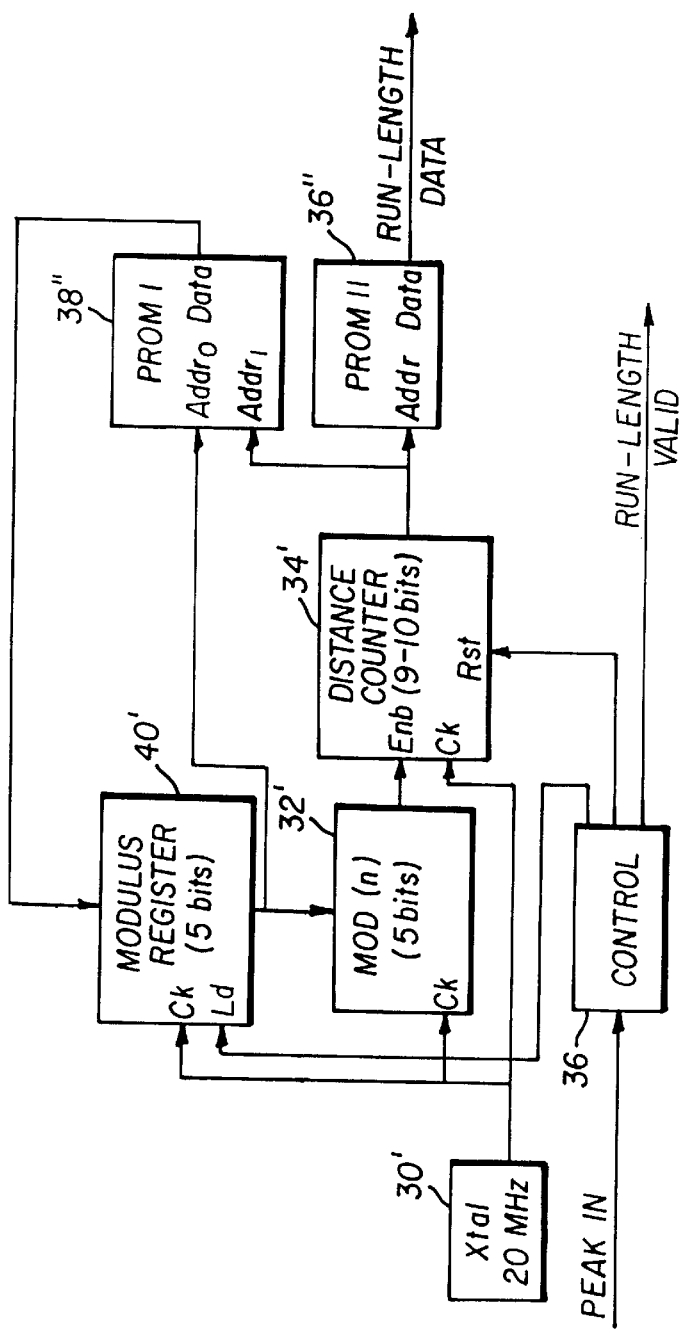
FIG. 8 is a block diagram of an embodiment of the sequence detector using lookup tables only.

Finally, a preferred method of construction is to recognize that the product of the multiplier and the modulus could, itself, be stored as a binary value in the PROM table 38". In this approach, the address of the PROM table must include both the distance counter value and the current modulus. This means a larger PROM address is used than in the circuit of FIG. 7, but for certain cases it results in simpler hardware. This method is diagrammed in FIG. 8 including the high frequency clock 301 of 20 MHz, such as a crystal.

Figure 9:
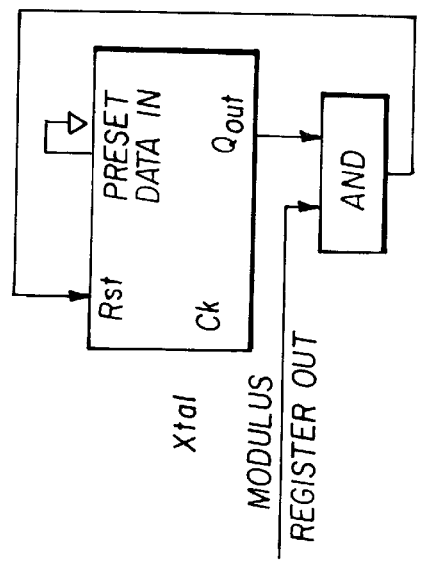
FIG. 9 is a block diagram of an example of a modulo (n) counter with programmable modulus, n.

FIG. 9 shows one form of a programmable modulus counter where the modulus is stored in a register for easy updating.

The invention has been described in detail with particular reference to preferred embodiments thereof, but it will be understood that variations and modifications can be effected within the spirit and scope of the invention.

What is claimed is:

1. A method of reproducing the number of consecutive zeros in a run-length coded peak detected channel, comprising the steps of:

measuring the interval between peaks of a run-length encoded digital data signal, wherein a peak represents a one and the absence of a peak represents a zero;

providing a look-up-table having entries for all possible intervals between peaks for the run-length code used and corresponding entries for the number of zeros between ones;

applying the measured interval to said look-up table to produce a string of zero bits between said one bits; and comparing the interval between peaks measured in said measuring step with a predetermined interval and modifying said measured interval as a function of any difference found in said comparing step.

2. The method of claim 1 wherein the interval measured in said measuring step is the time between peaks.

3. The method of claim 1 wherein the interval measured in said measuring step is the distance between peaks.

4. Apparatus for reproducing the number of consecutive zeros in a run-length coded peak detected channel, comprising:

a measuring circuit for measuring the interval between peaks of a run-length encoded digital data signal, wherein a peak represents a one and the absence of a peak represents a zero;

a look-up-table connected to said measuring circuit and having entries for all possible intervals between peaks for the run-length code and corresponding entries for the number of zeros between ones; wherein application of the measured interval produced by said measuring circuit to said look-up-table produces a string of zeros between peaks corresponding to said measured distance; and wherein said measuring circuit includes a high frequency clock and a counter coupled to said clock, such that consecutive peaks of a digital data signal reset said counter to produce a digital signal which is representative of the interval between peaks and which is applied as an address to said look-up-table.

5. The apparatus of claim 4 wherein the frequency of said clock is variable and including means for varying the frequency of said clock as a function of the difference between the measured interval and a nominal interval for the given peak-to-peak interval.

6. Apparatus for reproducing the number of consecutive zeros in a run length coded peak detected channel, comprising:

a high resolution clock;

an interval counter connected to said clock for counting pulses produced by said clock and having a reset;

a look-up-table connected to said clock having entries for all possible intervals between peaks for a run length coded digital data signal and corresponding entries for the number of zeros between ones; and means for applying a run-length encoded digital data signal having peaks representing ones and absence of peaks representing zeros, wherein the count of said counter between reset peaks is representative of the interval between peaks and wherein said output of said interval counter is applied as an address to said look-up-table to produce a string of zeros.

7. The apparatus of claim 6 including a division counter between said clock and said interval counter, said division counter dividing the high frequency clock signal from said clock by a modulus n; a modulus register connected to said division counter for storing said modulus n; and a timing offset circuit for determining the difference between the measured peak interval and a nominal peak interval and for changing the modulus stored in said modulus register as a function of said difference.

8. The apparatus of claim 6 including a multiplier, wherein said timing offset circuit is a modulus adjustment look-up-table, the output of which is applied to said multiplier along with the modulus stored in said modulus register to produce an adjusted modulus which is stored in said modulus register.

\* \* \* \* \*